US008305419B2

(12) United States Patent
Morita

(10) Patent No.: US 8,305,419 B2
(45) Date of Patent: Nov. 6, 2012

(54) IMAGE FORMING APPARATUS

(75) Inventor: Shinji Morita, Tokyo (JP)

(73) Assignee: Konica Minolta Business Technologies, Inc. (JP)

( * ) Notice: Subject to any disclaimer, the term of this patent is extended or adjusted under 35 U.S.C. 154(b) by 502 days.

(21) Appl. No.: 12/391,093

(22) Filed: Feb. 23, 2009

(65) Prior Publication Data

US 2009/0213203 A1 Aug. 27, 2009

(51) Int. Cl.

| | |
|---|---|
| ***B41J 15/14*** | (2006.01) |
| *B41J 2/435* | (2006.01) |
| *B41J 2/165* | (2006.01) |
| *B41J 23/00* | (2006.01) |
| *G01D 15/14* | (2006.01) |
| *G03G 21/00* | (2006.01) |
| *G03G 15/02* | (2006.01) |
| *G03G 15/20* | (2006.01) |

(52) U.S. Cl. ............ 347/241; 347/33; 347/36; 347/224; 399/98; 399/99; 399/100; 399/123

(58) Field of Classification Search .................. 347/241, 347/33, 34, 36; 399/98–100, 123
See application file for complete search history.

(56) References Cited

U.S. PATENT DOCUMENTS

| | | | | |
|---|---|---|---|---|
| 5,376,994 | A * | 12/1994 | Mama et al. | 399/93 |
| 5,612,767 | A * | 3/1997 | Iwama | 399/98 |
| 6,640,069 | B2 * | 10/2003 | Kanemoto | 399/117 |
| 7,203,444 | B2 * | 4/2007 | Yamazaki | 399/98 |
| 7,277,655 | B2 * | 10/2007 | Namba | 399/98 |
| 7,787,005 | B2 * | 8/2010 | Nomura et al. | 347/241 |
| 7,853,170 | B2 * | 12/2010 | Ueda et al. | 399/98 |
| 8,035,669 | B2 * | 10/2011 | Nakamura | 347/136 |
| 2002/0075350 | A1 * | 6/2002 | Sawicki | 347/33 |
| 2005/0243156 | A1 * | 11/2005 | Matsutomo | 347/136 |
| 2008/0259364 | A1 * | 10/2008 | Morita et al. | 358/1.9 |
| 2008/0317493 | A1 * | 12/2008 | Morita | 399/98 |
| 2009/0087209 | A1 * | 4/2009 | Yamaguchi | 399/98 |

FOREIGN PATENT DOCUMENTS

| | | | |
|---|---|---|---|
| JP | 2004-17607 | A | 1/2004 |
| JP | 2007-72321 | A | 3/2007 |
| JP | 2007293063 | A * | 11/2007 |

* cited by examiner

*Primary Examiner* — Stephen Meier
*Assistant Examiner* — Jeremy Bishop
(74) *Attorney, Agent, or Firm* — Cantor Colburn LLP

(57) ABSTRACT

An image forming apparatus, including: an image carrier; an exposure section, having a light emitting surface which is positioned above the image carrier, to focus the light rays on the surface of the image carrier; a cleaning section, having a cleaning member, to make the cleaning member to come into contact with the light emitting surface and to move the cleaning member on the light emitting surface, so that the cleaning member removes dust particles accumulated on the light emitting surface, wherein the cleaning section makes the cleaning member to move to an outside of an end portion of the light emitting surface; and a dust receiving section, mounted under the outside of the end portion of the light emitting surface, to receive the dust particles removed from the light emitting surface by the cleaning section.

6 Claims, 6 Drawing Sheets

IMAGE FORMING APPARATUS

CROSS REFERENCE TO RELATED APPLICATION

This application is based on Japanese Patent Application No. 2008-044100 filed on Feb. 26, 2008, with the Japanese Patent Office, the entire content of which is hereby incorporated by reference.

TECHNICAL FIELD

The present invention relates to image forming apparatuses, which include copier machines, printers, facsimile machines and like machines, operated by an electro-photographic technology.

BACKGROUND OF THE INVENTION

Image forming apparatuses are well-known, which are operated by an electro-photographic method, and incorporate an exposure section to form latent images on a photoconductive surface, by a lens array including an aligned cylindrical lens, and said lens array focuses light rays emitted from a light source including aligned plural light emitting bodies, such as LED (being a light-emitting diode) arrays.

In most cases of image forming apparatuses, in order to improve dust prevention effect, productivity, and maintenance work of the image forming apparatuses, structuring elements, such as the exposure section, the light source, the driving circuit of the light source, and the lens arrays, are united in a single unit as a print head.

Dust particles, such as toner particles flying within the image forming apparatus, tend to accumulate on a dust prevention glass surface which is mounted on the end or in front of the end of the lens array which works as a light emitting surface of the exposure section (included in the print head). The accumulated dust particles tend to generate line defects on any image formed by the image forming apparatus.

In order to prevent generation of said line defects, well-known is an image forming apparatus which incorporates a cleaning means (See Unexamined Japanese Patent application Publication 2007-72,321). Said cleaning means has a cleaning pad as a cleaning member, the cleaning pad is configured to come into contact with the light emitting surface of the print head, and to move on a guide groove provided on the side of the print head.

Further, disclosed is an image forming apparatus having another cleaning means (See Unexamined Japanese Patent application Publication 2004-17,607). That is, a dust prevention glass surface is provided on the light emitting surface of an optical unit structured to emit the light rays upward. While a cleaning pad or a cleaning brush is in contact with said dust prevention glass surface from the top, said dust prevention glass is driven so that the dust particles drop into a dust box provided on an appropriate position of the outside of the light emitting surface.

However, in a case of an image forming apparatus having a light emitting surface of the exposure section (being the print head), in which said light emitting surface faces downward, the above structure is not usable.

That is, any dust particles which are removed from the light emitting surface by the cleaning means, accumulate on the cleaning member which faces upward and wipes the light emitting surface, and the dust particles also accumulate on an end portion of the print head at which the cleaning member stops and all the dust particles are gathered together.

After the dust particles have accumulated on the end portion, said dust particles fall down due to vibration or on impact shock, and stain the image forming apparatus, which causes problems of defective printed images.

Specifically, concerning an image forming apparatus having an exposure section which is opened or closed by a hinge mechanism during the maintenance work, the impact shock due to opening or closing operation causes the above dust problems.

SUMMARY OF THE INVENTION

The present invention has been achieved to overcome the above problems, and an object is to prevent the dust particles, removed from the light emitting surface by the cleaning means, from falling down in an image forming apparatus, wherein said image forming apparatus includes an exposure section, uniting a light source structured of aligned plural light emitting bodies, and a lens array to focus light rays emitted from said light source onto a photoconductive body which is positioned under the light source, and a cleaning section which makes a cleaning member to come into contact with a light emitting surface of the exposure section, and makes the cleaning member to wipe the light emitting surface.

The object of this invention is attained by realizing an invention as below.

An image forming apparatus, including:

an image carrier;

an exposure section, having a light emitting surface which is positioned above the image carrier, to focus light rays on a surface of the image carrier;

a cleaning section, having a cleaning member, to make the cleaning member to come into contact with the light emitting surface, and to move the cleaning member on the light emitting surface, so that the cleaning member removes any dust particles accumulated on the light emitting surface, and to make the cleaning member to move to an outside of an end portion of the light emitting surface; and a receiving section, mounted under the outside of the end portion of the light emitting surface, to receive the dust particles removed by the cleaning section from the light emitting surface.

DETAILED DESCRIPTION OF THE PREFERRED EMBODIMENT

Figure 1:
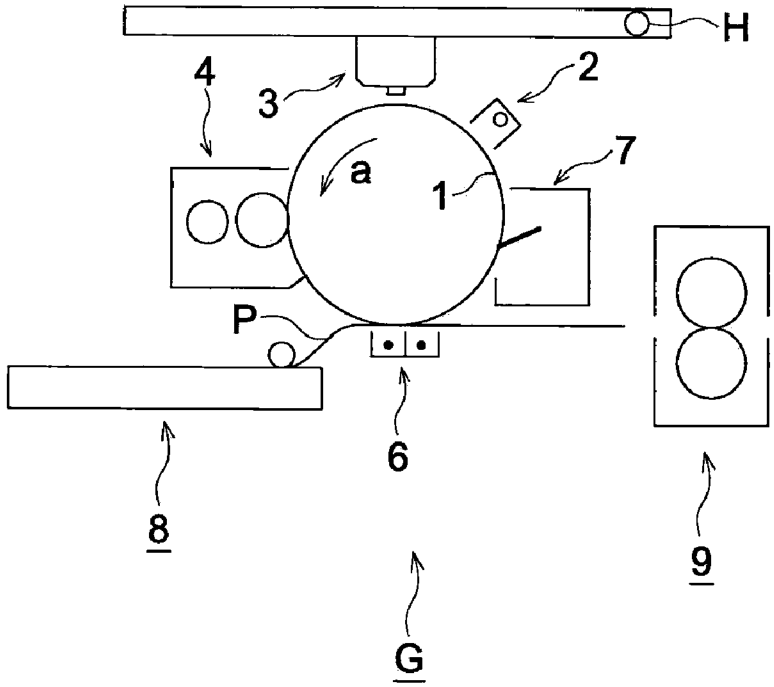
FIG. 1 is a schematic diagram of an image forming apparatus, having an exposure section which is configured to be opened or shut by a hinge.

Embodiments of the present invention will now be detailed, while referring to the drawings.

FIG. 1 shows a schematic diagram of image forming apparatus G, having an exposure section which is configured to be opened or shut by hinge H.

Image forming apparatus G shown in FIG. 1 is controlled by the well-known electro-photographic technology, having drum shaped photoconductor 1 serving as the image carrier, and rotating in arrowed direction "a". Various sections, such as electro-charging section 2, exposure section 3, developing section 4, transfer-separating section 6, and cleaning section 7, are mounted around photoconductor 1.

On the surface of photoconductor 1, which has been charged by electro-charging section 2, the exposure operation based on an image data is conducted by exposure section 3, whereby a latent image is formed.

The latent image, formed on the surface of photoconductor 1, is processed with toner by developing section 4, so that a toner image is generated.

The toner image, generated on the surface of photoconductor 1, is transferred at transfer-separating section 6, onto sheet P which is conveyed from sheet supplying section 8.

Sheet P, carrying the toner image, is conveyed to fixing section 9 to be pressed and heated as a fixing process, after which sheet P is ejected onto a predetermined tray.

After the toner image is transferred onto sheet P, any toner particles remaining on the surface of photoconductor 1, are removed by cleaning section 7, and photoconductor 1 awaits the next image formation process.

Figure 2:
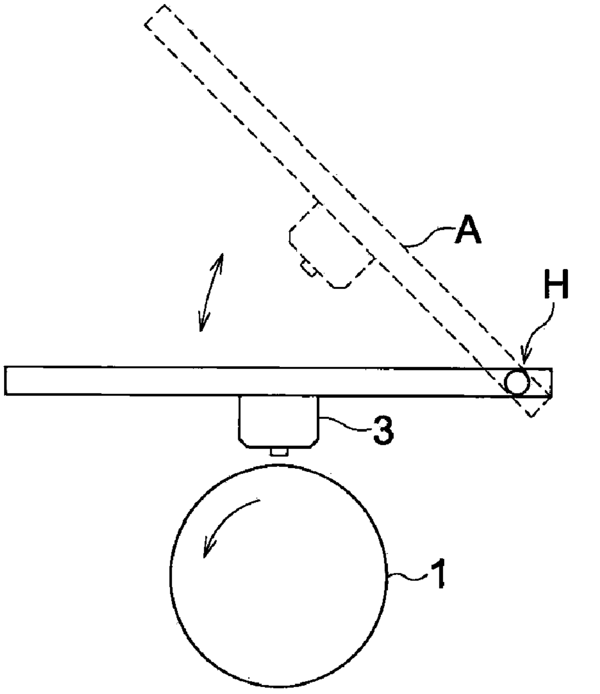
FIG. 2 shows the opening and closing movement of the exposure section.

FIG. 2 shows an opening and closing movement of exposure section 3.

In FIG. 2, since exposure section 3 of image forming apparatus G is mounted on supporting member A which is pivoted by hinge H, exposure section 3 moves with the opening and shutting movement of supporting member A.

A structure without using supporting member A may also be used, that is, a hinge may be mounted on an end of exposure section 3, and exposure section 3 is rotated around a shaft of said hinge, so that exposure section 3 can thereby be opened or shut.

The structure, having said opening and shutting mechanism for exposure section 3 of image forming apparatus G, are effective on the maintenance work, but exposure section 3 tends to receive the impact shock.

Figure 3:
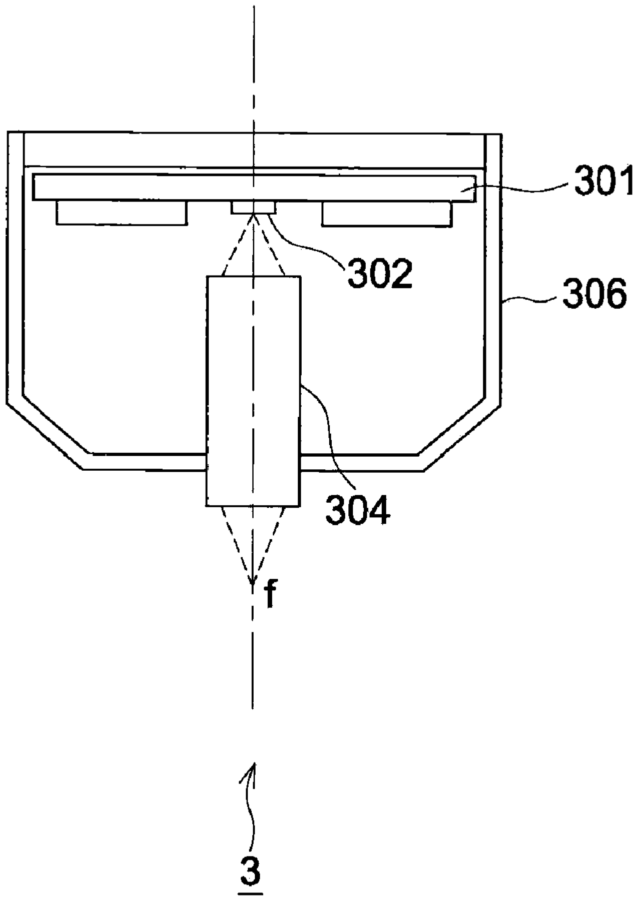
FIG. 3 is a schematic diagram of print head 3.

FIG. 3 is a schematic diagram of print head 3 serving as the exposure section.

The structure of print head 3 shown in FIG. 3, that is, the structure of the exposure section shows the most general example.

On base plate 301, mounted are LED array 302, structured of plural LEDs aligned on the depth direction of FIG. 3, and driving circuit 307 to drive said LEDs.

Cylindrical lens array 304 is mounted to face LED array 302 serving as the light emitting section. The emitted light rays from each LED are concentrated to focal point "f" as shown by dashed lines in FIG. 3. LED print head 3 is arranged in such a way that said focal point "f" comes to a circumferential surface of photoconductor 1.

As shown in FIG. 3, LED array 302, driving circuit 307, and cylindrical lens array 304 are united within housing 306, to be a single unit which is referred to as the print head.

The inside of said united exposure section is dust-preventive, however, the dust particles tend to adhere on the light emitting surface, which is the end portion of cylindrical lens array 304 exposed to the outside of the unit.

Figure 4:
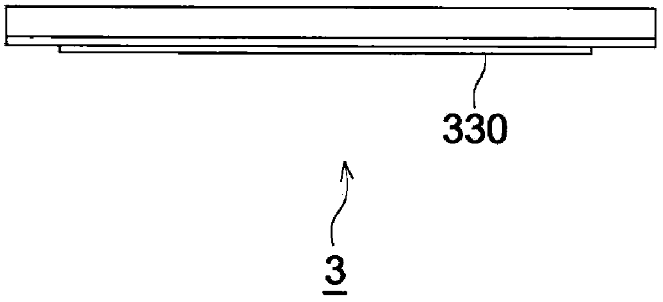
FIGS. 4(*a*) and 4(*b*) are outside drawings of print head 3.
Figure 4:
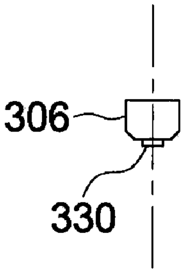

FIGS. 4(*a*) and 4(*b*) show an edge and end view of print head 3, respectively.

Light emitting surface 330 of elongated print head 3 in FIG. 4(*a*) corresponds to an end surface of cylindrical lens array 304 projected downward from housing 306 shown in FIG. 3 and FIG. 4(*b*).

In addition, a protective glass shield may be mounted on said end surface of cylindrical lens array 304.

Figure 5:
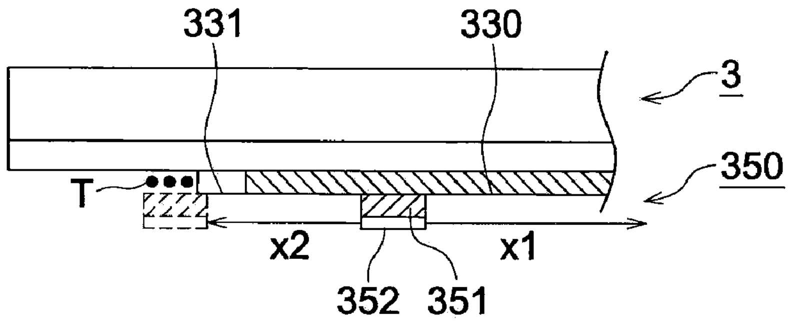
FIG. 5 shows a cross-section of the cleaning section.

FIG. 5 shows cleaning section 350.

Cleaning section 350 includes cleaning pad 351 serving as a cleaning member, pad supporting member 352, and pad driving section (which is not illustrated) which moves cleaning pad 351 and pad supporting member 352 in direction x1 or x2 in FIG. 5.

To move pad supporting member 352, said pad driving section uses guide members, such as wires which are connected to pad supporting member 352 as a well-known means to move pad supporting member 352 in direction x1 or x2 in FIG. 5.

In order to move cleaning pad 351, a hand movement is feasible, as well as an automatic driving means.

Outside surface 331, existing beyond both ends of light emitting surface 330, is the same surface as light emitting surface 330, but is an area not to serve as part of the light emitting surface.

Cleaning pad 351 is configured to come into contact with light emitting surface 330. Said cleaning pad 351 is driven until cleaning pad 351 reaches surface 331, which exists beyond the end portion of light emitting surface 330, so that cleaning pad 351 wipes away any dust particles T including toner particles, accumulated on light emitting surface 330.

Wiped dust particles T are absorbed by cleaning pad 351, or accumulated on the end portions of surface 331 located beyond both end portions of light emitting surface 330.

When impact shock is applied on print head 3, dust particles T, accumulated on the end portion of the area which is not a light emitting surface, tend to drop.

Such impact shock tends to be generated when the exposure section is opened or shut by the hinge, or when the pivoted supporting member is opened or shut by the hinge structured in the image forming apparatus.

Accordingly, in the image forming apparatus incorporating the above structures, the most important task is to prevent any deterioration of image quality, adversely affected by the dust particles being the dropped toner particles.

Figure 6:
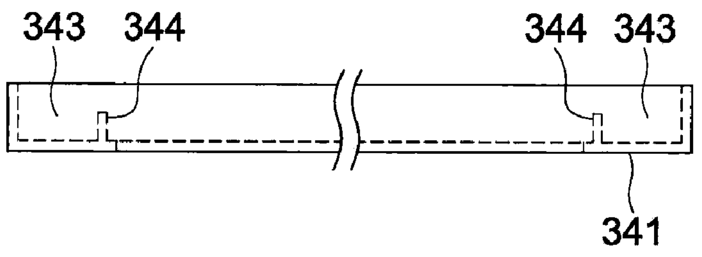
FIGS. 6(*a*), 6(*b*) and 6(*c*) show different views of dust receiving section 340.
Figure 6:
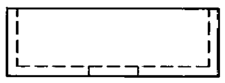
Figure 6:
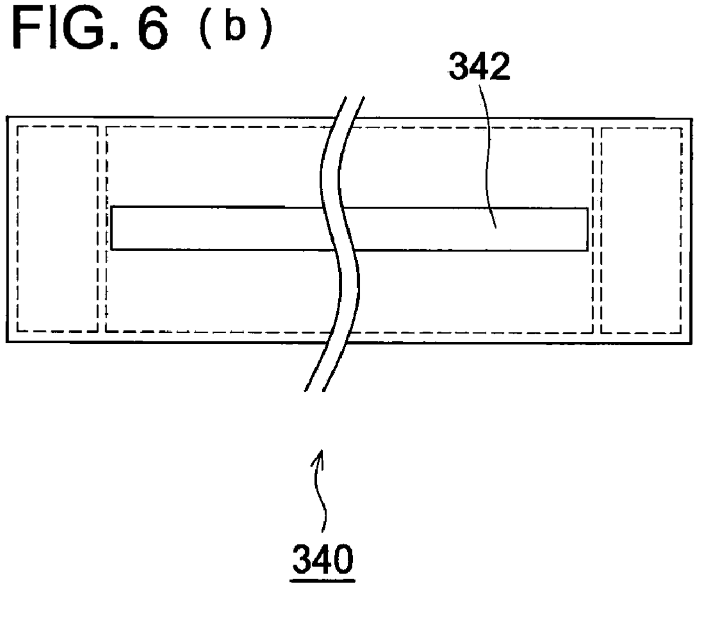

FIGS. 6(*a*), 6(*b*) and 6(*c*) show dust receiving section 340.

Dust receiving section 340, formed of a rectangular plate member, includes opening 342 on bottom surface 341.

The size of opening 342 is slightly greater than light emitting surface 330 of print head 3, so that the light rays emitted from light emitting surface 330 are not disturbed.

Dust particles T accumulate at the outside areas which are beyond the end portion of light emitting surface 330. Accordingly, dust receiving pockets 343 are mounted under said outside areas, so that dust particles T are gathered by cleaning section 350, and drop into receiving pockets 343. That is, dust receiving pockets 343 are mounted at the areas which extend beyond opening 342.

Barrier diffusions 344 are provided near opening 342 of dust receiving pockets 343, so that any received dust particles T are prevented from scattering outside. Due to this structure, after dust particles T are received in dust receiving pocket 343, dust particles T are prevented from scattering toward opening 342, that is, barrier diffusions 344 prevent dust particles T from passing through opening 342, and adhering onto image carrier 1.

Figure 7:
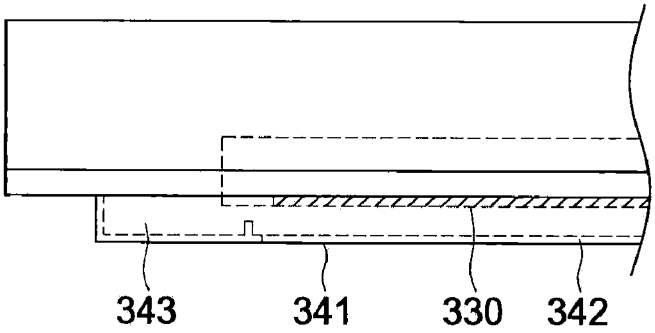
FIGS. 7(*a*) and 7(*b*) show dust receiving section 340 which is mounted under print head 3.
Figure 7:
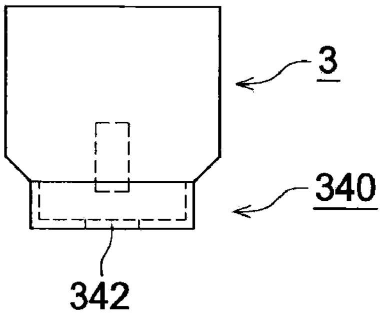

FIGS. 7(*a*) and 7(*b*) show dust receiving section 340 mounted under print head 3.

FIGS. 7(*a*) and 7(*b*) show a condition that dust receiving section 340 is mounted under print head 3, wherein an enlarged view of one end of receiving section 340 is illustrated in FIG. 7(*a*).

A guide member (which is not illustrated) to guide cleaning pad 351 is mounted along opening 342. Accordingly, cleaning pad 351 of cleaning section 350, which is not illustrated in FIGS. 7(*a*) and 7(*b*), comes into contact with light emitting surface 330 of print head 3, and moves along opening 342 of bottom surface 341 of dust receiving section 340, so that cleaning pad 351 wipes away any dust particles T adhered on light emitting surface 330.

After dust particles T are wiped away by cleaning pad 351, and stored at the end portions beyond light emitting surface 330, said dust particles T drop in dust receiving pockets 343.

As a different structure, a guide member to guide cleaning pad 351 may be configured to be united to a side wall of dust receiving section 340, whereby when cleaning pad 351 is driven, cleaning pad 351 is prevented from meandering by a side edge existing along the width direction of opening 342.

Said structure is effective to simplify the pad driving section.

Further, as another different structure, dust receiving section 340 may be configured to include a dust preventing section to prevent light emitting surface 330 of print head 3 from being covered with scattered dust particles T, flying on airflow generated by the rotation of photoconductor 1.

This structure is effective for controlling the production cost which will be increased by improving the reliability of the image forming apparatus.

Figure 8:
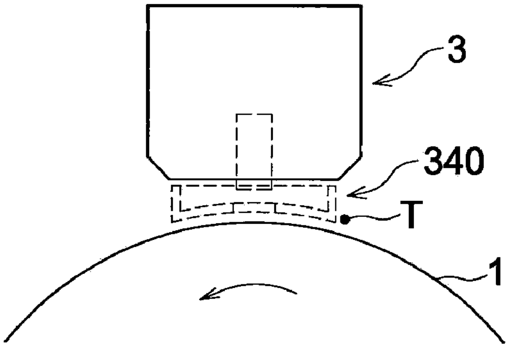
FIG. 8 shows dust receiving section 340, which also serves as a dust preventing member.

FIG. 8 shows dust receiving section 340 doubling as a dust preventing member.

In FIG. 8, the airflow, shown by an arrow, is generated by the rotation of photoconductor 1. Dust particles T, including toner particles, fly up and move along the surface of photoconductor 1 by the airflow, after which dust particles T may adhere onto light emitting surface 330 of print head 3.

In order to prevent dust particles T from adhering to said surface, a dust preventing member, as one case, is mounted near the surface of rotating photoconductor 1, whereby dust particles T, moving upstream of print head 3, are adhered onto the dust preventing member.

Further, since dust receiving section 340 is shaped as shown in FIG. 8, said dust receiving section 340 doubles to function as a dust preventing member. That is, the bottom surface of dust receiving section 340, facing the surface of photoconductor 1, is curved along the surface of photoconductor 1. The clearance between the bottom surface of dust receiving section 340 and the surface of photoconductor 1 is very small, whereby though dust particles T fly near photoconductor 1, dust particles T tend not to adhere onto light emitting surface 330.

The present invention is detailed in an example of the image forming apparatus which has a single print head. The present invention is more effective in an image forming apparatus which has plural print heads.

Figure 9:
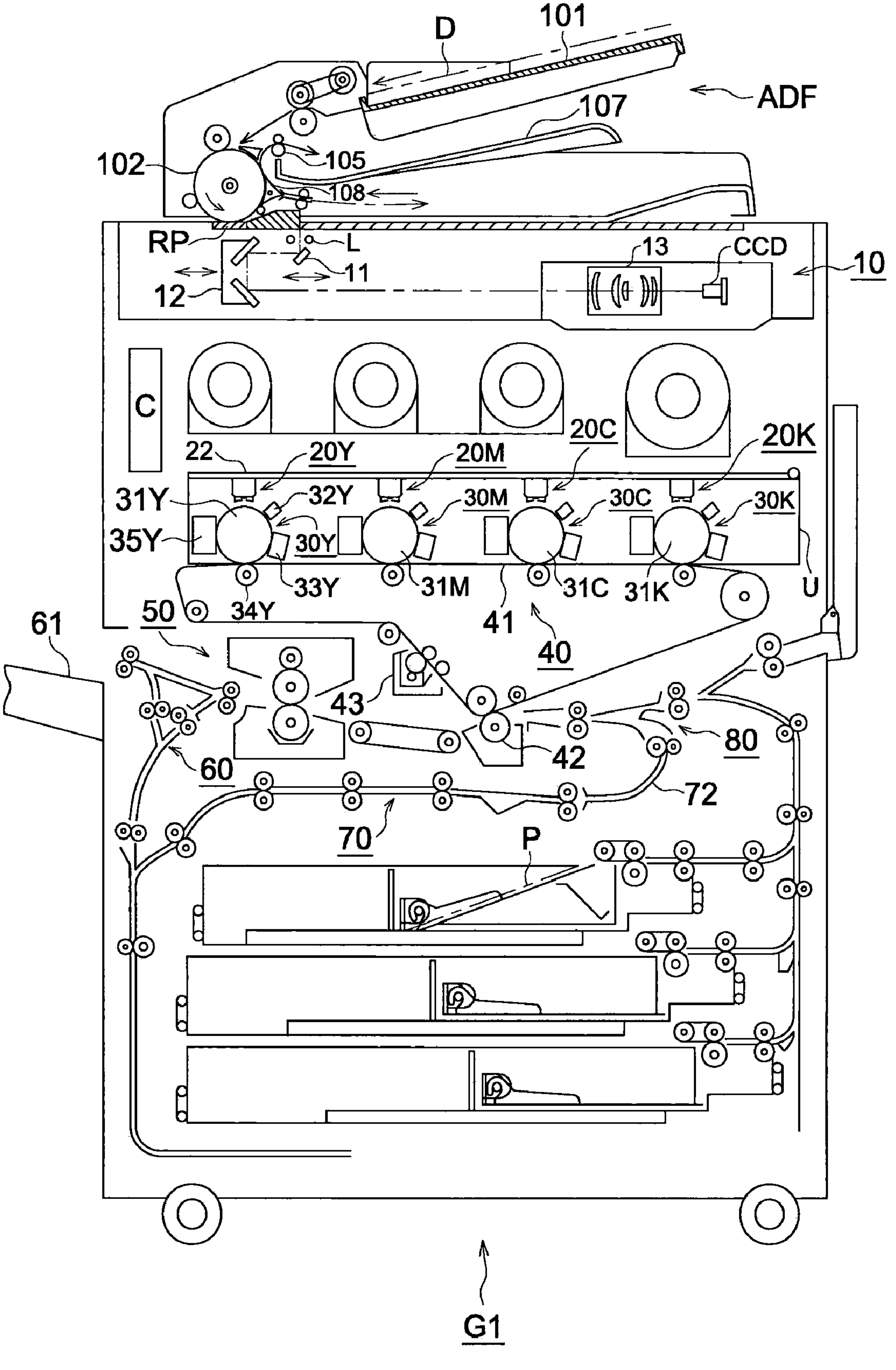
FIG. 9 is an overall schematic diagram of a multi-color image forming apparatus.

FIG. 9 shows multi-color image forming apparatus G1.

Said multi-color image forming apparatus G1 includes automatic document feeding device ADF.

Original documents D are placed on document platen 101 of automatic document feeding device ADF. Original documents D are conveyed one by one through a document feeding route, and further conveyed by conveyance drum 102.

While original document D is conveyed, any images carried on original document D are read by document reading section 10 at document reading position RP. After the reading operation is completed, original document D is ejected onto document ejection plate 107, through first conveyance guide 108 and paired document ejecting rollers 105.

Multi-color image forming apparatus G1 is structured of document reading section 10, exposure sections 20Y, 20M, 20C and 20K, image forming sections 30Y, 30M, 30C and 30K, intermediate transfer section 40, image fixing section 50, sheet reversing ejection section 60, sheet re-supplying section 70, sheet supplying section 80, and control section C, all of which are accommodated in a single body.

Document reading section 10 illuminates the image carried on original document D by lamp L at document reading position RP, and guides the light reflected from the image, through first mirror unit 11, second mirror unit 12, and lens 13, to focus said light at a light receiving section on image capturing element CCD.

The focused image signal is photo-electrically converted by capturing element CCD, and is processed with respect to A/D conversion, shading correction, and image compression by control section C. Said processed signal is stored in a memory device of control section C as image data.

The image data, stored in the memory device, is appropriately processed by conditions determined by a user, to be formed as an output image data.

Exposure sections 20Y, 20M, 20C and 20K represent print heads, each having an LED array as a light source.

Referring to output information which is outputted in accordance with the output image data sent from control section C, exposure sections 20Y, 20M, 20C and 20K use the print heads and conduct scanning exposure on the surfaces of photoconductors 31Y, 31M, 31C and 31K, which are structuring elements of image forming sections 30Y, 30M, 30C and 30K, respectively.

Due to the scanning exposure, conducted by the print heads, respective colored latent images are formed on photoconductors 31Y, 31M, 31C and 31K.

Image forming section 30Y is structured of photoconductive body 31Y and various sections which are arranged around said photoconductive body 31Y, such as main charging section 32Y, developing section 33Y, first transfer roller 34Y, and cleaning section 35Y. Image forming sections 30M, 30C and 30K are structured in the same way as image forming section 30Y.

The latent images formed on photoconductive bodies 31Y, 31M, 31C and 31K are processed by developing sections 33Y, 33M, 33C and 33K, respectively, to become color toner images.

The toner images, formed on photoconductive bodies 31Y, 31M, 31C and 31K, are sequentially transferred by first transfer rollers 34Y, 34M, 34C and 34K, onto a predetermined position of intermediate transfer belt 41, which serves as an intermediate transfer body of intermediate transfer section S.

After the above intermediate transfer operations are completed, the surfaces of photoconductive bodies 31Y, 31M, 31C and 31K are cleaned by cleaning sections 35Y, 35M, 35C and 35K, whereby all remaining toner particles are removed.

The toner images, transferred onto intermediate transfer belt 41, are further transferred onto sheet P by second transfer roller 42, in which sheet P serves as a transfer member, supplied from sheet supplying section 8, and synchronically conveyed by sheet supplying roller 81.

After the toner images are transferred onto sheet P, intermediate transfer belt 41 is cleaned by belt cleaning section 4, to await the next image transfer operation.

Sheet P, carrying the toner images, is conveyed to image fixing section 50, where the toner images are fixed on sheet P by applied heat and pressure.

After the fixing operation is completed on sheet P by image fixing section 50, sheet P is conveyed by reversing-ejection section 60, and ejected onto sheet receiving tray 61.

In a case that image formation is to also be conducted on the reverse surface of sheet P, after the image fixing operation is conducted on the front surface of sheet P, sheet P is conveyed to re-supplying section 70, located below sheet fixing section 50, at which sheet P is reversed. After that, sheet P is conveyed to re-supplying conveyance route 72, and image formation is also conducted on the reverse surface of sheet P.

Exposure sections 20Y, 20M, 20C and 20K, as well as image forming sections 30Y, 30M, 30C and 30K, of above described multi-color image forming apparatus G1, are structured in unit U, being a single unit, which can be pulled out by the user.

Further, exposure sections 20Y, 20M, 20C and 20K, which are supported by supporting member 22 of said pulled unit U, are pivoted on hinge H of supporting member 22, allowing unit U to be rotated upward.

Figure 10:
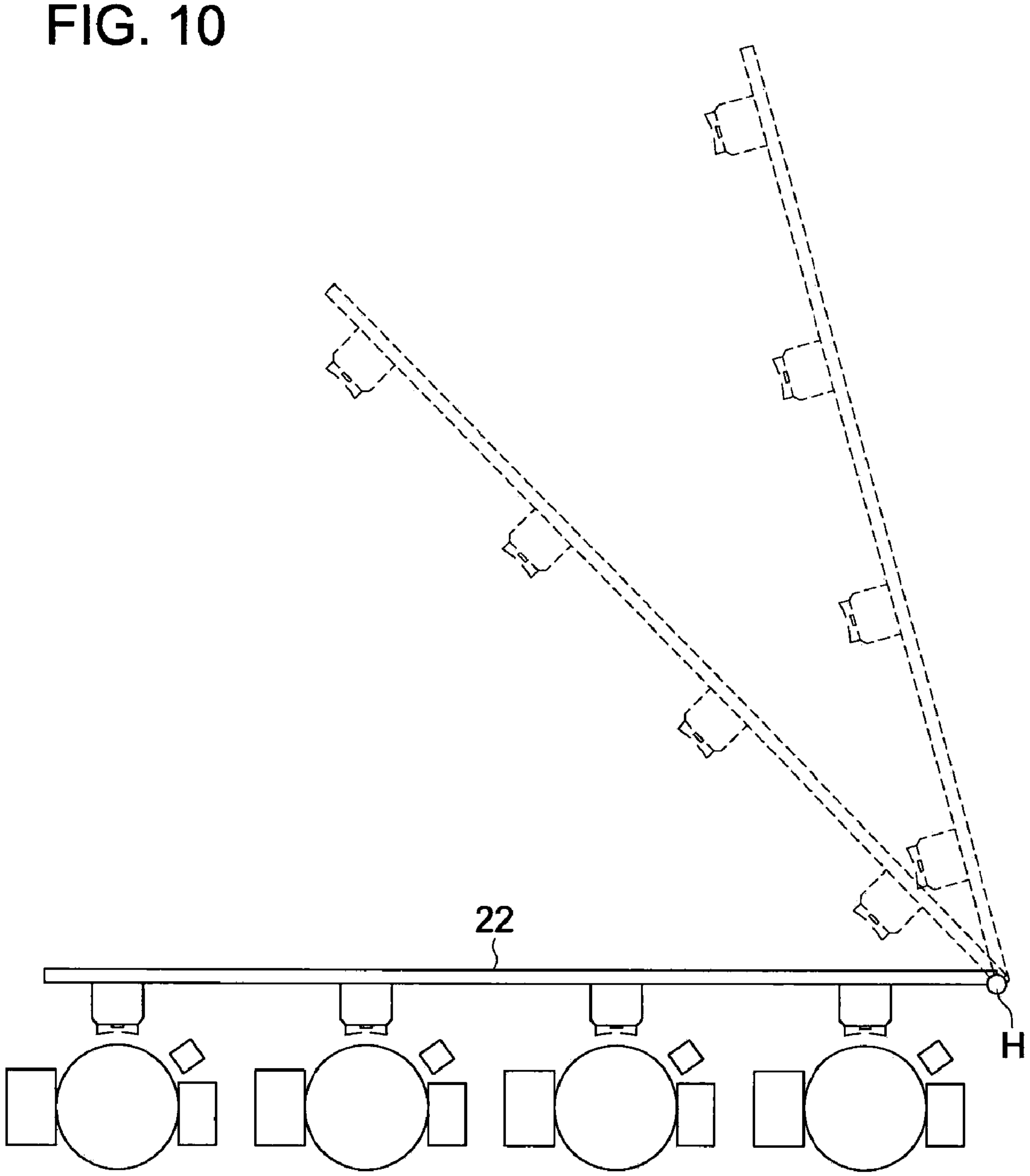
FIG. 10 shows several stages in the opening and closing movement of the exposure sections of the multi-color image forming apparatus.

FIG. 10 shows the opening and closing movement of exposure sections 20Y, 20M, 20C and 20K of the multi-color image forming apparatus G1.

Though the structure shown in FIG. 10 is convenient for maintenance work, dust particles T, including toner particles accumulated on the end portions of the print heads, tend to drop down due to the impact shock caused by the opening and closing operation, which can result in deterioration of image quality.

The present invention is effective, particularly on the image forming apparatus having the above structure.

Concerning the effect of the present invention, the dust removed from the light emitting surface is prevented from dropping down into the apparatus, so that the apparatus is prevented from being dusty, and deterioration of the image quality due to stay dust, can be prevented.

What is claimed is:

1. An image forming apparatus, comprising:

an image carrier;

an exposure section, including in a unit:

a light source in which plural light emitting bodies are aligned;

a lens array which focuses the light rays emitted from the light source at the surface of the image carrier mounted below the exposure section, wherein the exposure section is opened by being moved in an upper direction; and a light emitting surface which is positioned above the image carrier, to focus the light rays on a surface of the image carrier;

a hinge section to support the exposure section so that a distance between the exposure section and image carrier is altered during opening or shuttering of the image forming apparatus;

a cleaning section, having a cleaning member, to make the cleaning member to come into contact with the light emitting surface, and to move the cleaning member on the light emitting surface, so that the cleaning member removes dust particles accumulated on the light emitting surface, wherein the cleaning section makes the cleaning member to move to an outside of an end portion of the light emitting surface; and a dust receiving section, mounted under the outside of the end portion of the light emitting surface, to receive the dust particles removed from the light emitting surface by the cleaning section, wherein the dust receiving section includes an opening section facing the light emitting surface of the exposure section, and plural dust receiving pocket sections to receive the dust particles removed by the cleaning member, wherein the plural dust receiving pocket sections are positioned above outsides of both ends of the image carrier in an axial direction of the image carrier.

2. The image forming apparatus of claim 1, wherein the dust receiving section includes a barrier to prevent the dust particles from scattering outside the pocket section.

3. The image forming apparatus of claim 1, wherein the cleaning section makes the cleaning member to move along the opening section.

4. The image forming apparatus of claim 1, wherein a surface of the dust receiving section facing the image carrier is configured to shape along the surface of the image carrier.

5. The image forming apparatus of claim 1, wherein the exposure section is supported by a supporting member to alter the distance between the exposure section and the image carrier by a hinge.

6. The image forming apparatus of claim 1, comprising plural image carriers; and plural exposure sections, wherein the plural image carriers and the plural exposure sections are united in a single unit.

* * * * *

UNITED STATES PATENT AND TRADEMARK OFFICE

CERTIFICATE OF CORRECTION

PATENT NO. : 8,305,419 B2
APPLICATION NO. : 12/391093
DATED : November 6, 2012
INVENTOR(S) : Morita It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 624 days.

Signed and Sealed this
Second Day of September, 2014

Michelle K. Lee

Michelle K. Lee
*Deputy Director of the United States Patent and Trademark Office*